(12) United States Patent
Hosoya et al.

(10) Patent No.: US 6,484,242 B2
(45) Date of Patent: Nov. 19, 2002

(54) CACHE ACCESS CONTROL SYSTEM

(75) Inventors: Mutsumi Hosoya, Fujimi (JP); Michitaka Yamamoto, Machida (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 09/809,217

(22) Filed: Mar. 16, 2001

(65) Prior Publication Data

US 2002/0007440 A1 Jan. 17, 2002

(30) Foreign Application Priority Data

Jul. 14, 2000 (JP) .................... 2000-213803

(51) Int. Cl.[7] .............................. G06F 12/02
(52) U.S. Cl. .................. 711/144; 711/122; 711/133; 711/142; 711/143; 711/145
(58) Field of Search ................. 711/122, 133, 711/143, 144, 145, 141, 142

(56) References Cited

U.S. PATENT DOCUMENTS

| | | | |
|---|---|---|---|
| 5,140,681 A | | 8/1992 | Uchiyama et al. |
| 5,228,136 A | * | 7/1993 | Shimizu et al. ............. 711/121 |
| 5,241,664 A | * | 8/1993 | Ohba et al. ................. 711/121 |
| 5,301,298 A | * | 4/1994 | Kagan et al. ............... 711/141 |
| 5,353,428 A | | 10/1994 | Shibata |
| 5,463,759 A | * | 10/1995 | Ghosh et al. ............... 711/105 |
| 5,553,266 A | * | 9/1996 | Metzger et al. ............. 711/121 |
| 5,572,667 A | | 11/1996 | Ideta |
| 5,860,111 A | * | 1/1999 | Martinez et al. ............ 711/121 |
| 6,240,491 B1 | * | 5/2001 | Abily et al. ................ 711/144 |

FOREIGN PATENT DOCUMENTS

| | | |
|---|---|---|
| JP | 01-026643 A | 1/1989 |
| JP | 02-2226449 A | 9/1990 |
| JP | 04-123151 A | 4/1992 |
| JP | 04-296950 A | 10/1992 |
| JP | 05-073416 A | 3/1993 |
| JP | 08-095862 | 4/1996 |

* cited by examiner

*Primary Examiner*—Hiep T. Nguyen (57) ABSTRACT

A cache access control system for dynamically conducting specification of dedicated and common regions and thereby always conducting optimum cache coherency control. In a processor, an L1 cache including an L1 data array and a directory is provided. A plurality of L2 caches are connected to each L1 cache. The L2 caches are connected to a main memory L3. An L2 cache history manager is supplied with L2 cache status information and an L2 cache access request from L2 caches. The L2 cache history manager judges an attribute (a dedicated region or a common region) of each line of L2. On the basis of the attribute, a cache coherency manager conducts coherency control of each L2 cache by using an invalidation type protocol or an update type protocol. The attribute is judged to be the common region, only in the case where a line shared by a plurality of L2 caches in the past is canceled once by the invalidation type protocol and then accessed again.

6 Claims, 7 Drawing Sheets

EM : EXCLUSIVE MODIFIED
CEM : CANCELLED EXCLUSIVE MODIFIED
SM : SHARED MODIFIED
EC : EXCLUSIVE CLEAN
SC : SHARED CLEAN
I : INVALID

F : FETCH
S : STORE
P : PURGE
WB : WRITE BACK

I : INVALID
EM : EXCLUSIVE MODIFIED
CEM : CANCELLED EXCLUSIVE MODIFIED
SM : SHARED MODIFIED
EC : EXCLUSIVE CLEAN
SC : SHARED CLEAN

FIG. 5

EM : EXCLUSIVE MODIFIED
EC : EXCLUSIVE CLEAN
SC : SHARED CLEAN
I : INVALID

F : FETCH
S : STORE
P : PURGE
WB : WRITE BACK

FIG. 6

EM : EXCLUSIVE MODIFIED
SM : SHARED MODIFIED
EC : EXCLUSIVE CLEAN
SC : SHARED CLEAN
I : INVALID

F : FETCH
S : STORE
P : PURGE
WB : WRITE BACK

CACHE ACCESS CONTROL SYSTEM

BACKGROUND OF THE INVENTION

The present invention relates to a method of fast referring to a cache memory among a plurality of processors, and a data processing system using this method. In particular, the present invention relates to a cache memory reference control system and a data processing system which are suitable for such a system that a plurality of processors share a memory system.

In a data processor including a plurality of processors each having a cache memory, it is necessary to conduct cache coherency control so that contents of cache memories will not incur a contradiction among processors.

As heretofore well known, cache coherency control methods are broadly classified into store-through (referred to as write-through as well) protocols and store-in (referred to as write-back or copy-back as well) protocols.

The store-through protocol is such a method that when a processor has written data into a cache memory in a processor a lower order hierarchy memory (such as a main storage) is also updated.

The store-in protocol is such a method that even in the case where data has been written into a cache memory in a processor such control as not to update the lower order hierarchy memory is conducted until an access request from another processor occurs.

The store-through protocol is simpler in control and easier in implementation than the store-in protocol. In the store-through protocol, however, the frequency of access to the lower order hierarchy memory increases. If the number of processors is increased, therefore, performance degradation caused by contention poses a problem.

In the case of the store-in protocol, the control becomes complicated, but the frequency of write access to the lower order hierarchy memory can be decreased. If the store path throughputs are the same, therefore, the store-in protocol becomes higher in performance than the store-through protocol.

The control complication of the store-in protocol is caused by the coherency control conducted when writing data into a cache. In the case where the coherency control is not required, therefore, the store-in control becomes equal in complication to the store-through control.

Therefore, the following system has been contrived. In this system, a memory space is divided into a common region shared by a plurality of processors and dedicated regions respectively dedicated to single processors. In the common region, cache coherency control is required. In the dedicated regions, cache coherency control is not required. For the common region, the store-through protocol is used. For the dedicated regions, the store-in protocol is used.

For example, in a cache coherency control scheme disclosed in JP-A-1-26643, accessed regions are divided into a common region accessed in common from all processors and individual regions accessed individually from respective processors. For the common region, the write-through (store-through) system is used. For the individual regions, the write-back (store-in) system is used.

As other such relating processors, those described in U.S. Pat. No. 5,140,681, JP-A-2-226449, U.S. Pat. No. 5,353,428, JP-A-4-123151, JP-A-4-296950, JP-A-5-73416, and U.S. Pat. No. 5,572,667 can be mentioned.

Apart from the classification of the store-in protocol and store-through protocol, cache coherency control can also be classified into two types: invalidation type protocol and update type protocol.

When writing has been conducted on a certain cache memory, there is a copy of the same data as data subjected to the alteration in another cache memory as well in some cases. In such a case, the invalidation type protocol dissolves contradiction by invalidating copy data.

When the above described cache coherency control has become necessary, the update type protocol conducts control so as to dissolve contradiction by updating the copy with altered data.

The invalidation type protocol is simpler in control and easier in implementation.

The performance depends on a memory access pattern and so on. It cannot be said unconditionally which protocol is advantageous. For bringing contents of cache memories of processors into the same status, however, the update type protocol can conduct it faster because the update type protocol does not pass through a lower order hierarchy memory.

In general, the invalidation type protocol is adopted in many cases. However, such a system that both protocols are mixedly present has also been contrived.

For example, in a system disclosed in JP-A-8-95862, a memory space is divided into a high-reliability area and a normal area. Control is conducted by using the update type protocol for the high-reliability area and the invalidation type protocol for the normal area.

In the conventional technique in which switchover of store-in protocol over to the store-through protocol and vice versa are conducted, specification of the common region and the dedicated regions serving as a criterion of the switchover is based on a memory address range or discrimination of processors. Division to the two regions is fixed.

Furthermore, in the conventional technique in which switchover of the invalidation type protocol to the update type protocol and vice versa are conducted, the switchover is based on a fixed regional partitioning that is in turn based on an address range.

SUMMARY OF THE INVENTION

In switchover of the cache coherency control protocol based on these fixed divisions, a sufficient function cannot be demonstrated, if regional partitioning cannot be determined until a program is executed.

For example, when it cannot be determined by only static analysis before program execution whether certain data corresponds to a dedicated region or a common region, the data might be actually data that is used for dedicated use and that should be processed with the store-in protocol. Even in this case, the data cannot help being handled as common data with the store-through protocol. As a result, performance degradation occurs.

Furthermore, it is actually difficult to conduct division statically for such an existing program that definite partition into dedicated regions and the common region is not conducted.

In the conventional technique, regional division serving as the criterion of switchover of cache coherency control is conducted fixedly. This results in a problem that it is impossible to sufficiently cope with such an existing program that a dynamic behavior of a program and the above described regional division are disregarded.

In the conventional technique, the invalidation type protocol is widely used because it can be implemented easily.

In the case where the invalidation type protocol is applied to the common region, however, performance degradation due to mutual invalidation appears remarkably. This is another problem.

This problem is caused by the following phenomenon. A plurality of processors conduct writing into the common region. As a result, data invalidation is conducted mutually. Resultant frequent access to the lower order hierarchy memory causes the above described performance degradation.

In the conventional technique, such a reference form to the common region that access to the same region is repeated is disregarded, and the invalidation type protocol is used for both the common region and the dedicated regions. This results in a problem that performance degradation is caused by mutual invalidation in the common region.

An object of the present invention is to provide a method of dynamically conducting specification of the dedicated regions and the common region, and thereby always conduct optimum cache coherency control to solve the problems caused by fixed regional division in the conventional technique.

Another object of the present invention is to solve the problems concerning the mutual invalidation in the conventional technique by using an optimum control system to the common region.

A representative mode of the present invention has the following configuration.

In a data processing system including a plurality of cache memories, such as a data processing system including a plurality of processors each having a cache memory, a cache history manager connected to respective caches and a coherency manager for conducting coherency control of respective caches are provided.

Each cache includes a cache data array and a cache directory. In the cache directory, line (or block or the like) status information is stored.

In response to a cache access request, a cache outputs a cache access request and cache status information to the cache history manager. Thereupon, the cache history manager generates new cache status information of a line accessed by the input from the cache, returns the new cache status information to the cache, judges an attribute (a dedicated region or a common region) of the line on the basis of the generated cache status information, and delivers the attribute of the judgment result to the coherency manager.

The attribute is judged to be the common region, only in the case where a line shared by a plurality of L2 caches in the past is canceled once by the invalidation type protocol and then accessed again. Otherwise, the attribute is judged to a dedicated region.

In the case where the attribute is a common region, the coherency manager uses an update type protocol or a store-through protocol. In the case where the attribute is a dedicated region, the coherency manager uses an invalidation type protocol or a store-in protocol.

Other modes of the present invention are made clear in description of preferred embodiments.

DETAILED DESCRIPTION OF THE EMBODIMENTS

Hereafter, a cache coherency control method based on dynamic regional division according to the present invention and a multiprocessor system using the cache coherency control method will be described by referring to the drawing.

Figure 1:
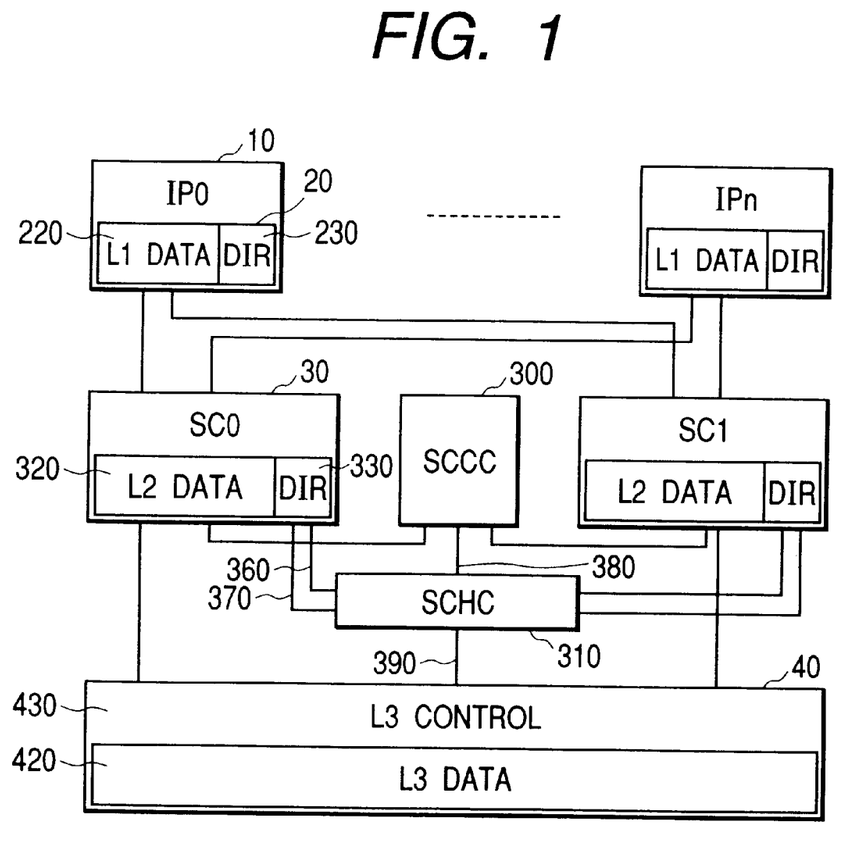
FIG. 1 is a block diagram showing a memory configuration of a multiprocessor system of an embodiment according to the present invention.

FIG. 1 shows a memory configuration of a multiprocessor system of an embodiment according to the present invention. A memory of the multiprocessor system of the present embodiment has a three order hierarchy structure of L1 through L3. A plurality of L1 memory units 20 and a plurality of L2 memory units 30 are provided.

An L1 memory unit 20 is provided in each of a plurality of processors (IP0 to IPh) 10. Each L1 memory unit 20 includes an L1 cache data array 220 and an L1 cache directory 230. In the same way, each of the L2 memory units (SC0 and SC1) 30 includes an L2 cache data array 320 and an L2 cache directory (dir) 330. An L3 memory unit 40 includes an L3 data array 420 and its controller 430.

In each cache data array, data read from a lower order hierarchy memory are stored. Each cache directory stores relations between locations in the data array and memory addresses. In the cache, consecutive address regions having a predetermined size is taken as a unit of data management. In each cache directory, information for respective data management units is registered.

Hereafter, the unit of data management in the L1 cache is referred to as block, and the unit of data management in the L2 cache is referred to as line.

An L2 cache history manager (SCHC) 310 monitors the status of the L2 memory units. The L2 cache history manager (SCHC) 310 knows requests of line read from L3 (fetch), line write from L1 (store), line write back into L3 (write back), and line registration cancel (purge) by an L2 cache access request 370. Furthermore, the L2 cache history manager (SCHC) 310 can know line status information representing, for example, in which L2 memory unit each line of the L2 cache is previously registered, through L2 cache status information 360.

By monitoring information of these kinds affecting internal statuses of the L2 memory units, the L2 cache history manager (SCHC) 310 judges an attribute of each line of L2 (whether it corresponds to a dedicated region or the common region).

A result thereof is conveyed to an L2 cache coherency manager (SCCC) 300 as L2 cache attribute information 380. In the L2 cache coherency manager (SCCC) 300, an optimum L2 cache coherency control method is executed on the basis of the attribute 380.

To be concrete, when a store request is issued for a line belonging to the common region by the L1 cache, the update type protocol is applied to other L2 memory units using the pertinent line. For a line belonging to the dedicated regions, however, coherency control using the invalidation type protocol is conducted.

By thus switching over the L2 cache coherency control according to the line attribute, the performance degradation caused by mutual invalidation between L2 memory units can be prevented also for store requests issued to the dedicated regions.

Reference history information used in the present invention is stored in the cache directory 330.

Hereafter, a method for implementing the cache directory 330 will be described.

Figure 3:
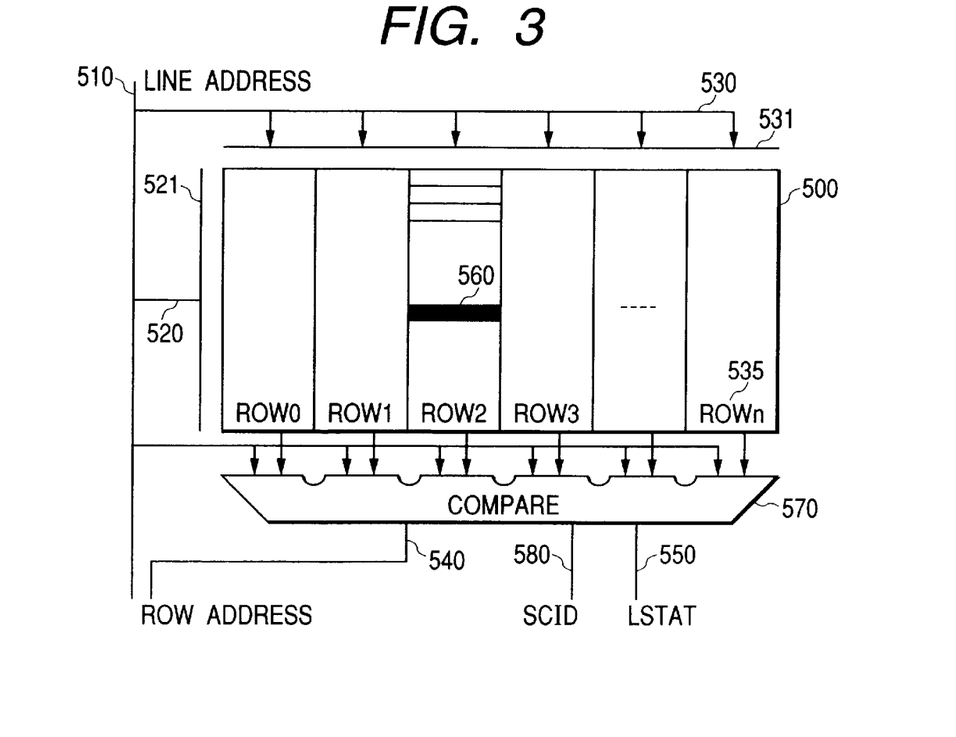
FIG. 3 is a block diagram showing a configuration of a cache directory used for cache coherency control of the above described embodiments.

FIG. 3 shows an example thereof, and its configuration is the same as that of an ordinary cache directory. A directory 500 is searched for a line that is a subject of an access request, on the basis of a line address 510.

In order to use a table efficiently, its structure is made set-associative. In other words, for lines having the same high-order bits (column address), a plurality of regions (rows 535) are shared. A row to be used is determined by an ordinary replacement algorithm such as LRU.

More specifically, a column in the table is selected by a column address selector 521 on the basis of a column address 520 of line address high-order bits. In addition, a row in the table is selected by a row address selector 531 on the basis of a row address 530 determined by the replacement algorithm.

One region (entry 560) in a directory (history directory) specified by the column address and the row address has coded information of respective lines therein.

Figure 4:
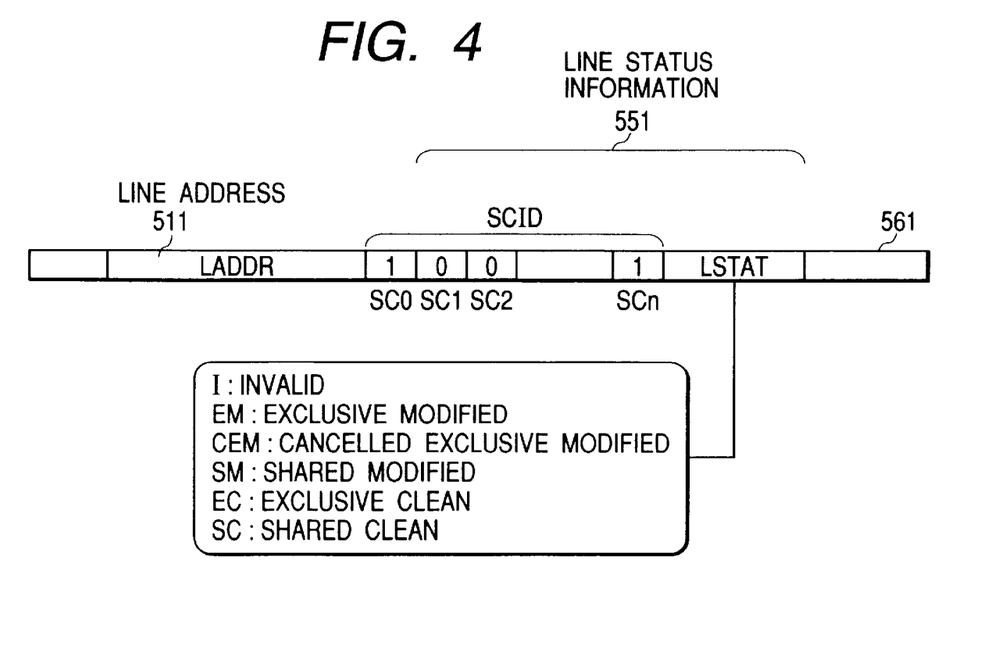
FIG. 4 is a block diagram showing an entry configuration of a cache directory used for cache coherency control of the above described embodiments.

A configuration example of this entry is shown in FIG. 4. The entry has a line address (LADDR), an identification number (SCID) of of an L2 memory unit using its line, and reference history information (LSTAT) of its line, stored therein. The SCID has information of one bit stored therein for each L2 memory unit in order to indicate whether the L2 memory unit is using the line.

The LSTAT is obtained by encoding the reference history information of that line. The LSTAT will be described in detail later.

When reading out the entry from the directory of FIG. 3, one column specified by a column address is read out as a whole. Each entry read out has a line address 511 stored therein as described with reference to FIG. 4. By comparing in a comparator 570 this with an actual line address 510, an entry corresponding to the line can be known. If a corresponding entry is found (HIT) as a result of comparison, then a row address 540 and a line status (SCID and LSTAT) 551 that are hit are outputted.

The structure of the directory 330 of FIG. 1 corresponds to the structure of the data array 320 in one-to-one form. In other words, when accessing the data array 320, desired line data can be accessed by using the column address and the row address 540 of the hit directory entry.

On the other hand, the hit line status 551 is conveyed to the history manager 310 through 360 and 370 together with an access request f or the pertinent line, and used to judge the attribute of the line (the dedicated regions or the common region) and determine the next line status.

In the case where a new status transition has occurred, its result is reflected onto the directory entry as well through 360 again.

How to implement the history manager 310 will now be described by referring to FIGS. 5 to 7.

As described above, the history manager 310 knows the current line status and an access request to the pertinent line. On the basis thereof, the history manager 310 determines the next line status by using a status transition diagram.

Figure 5:
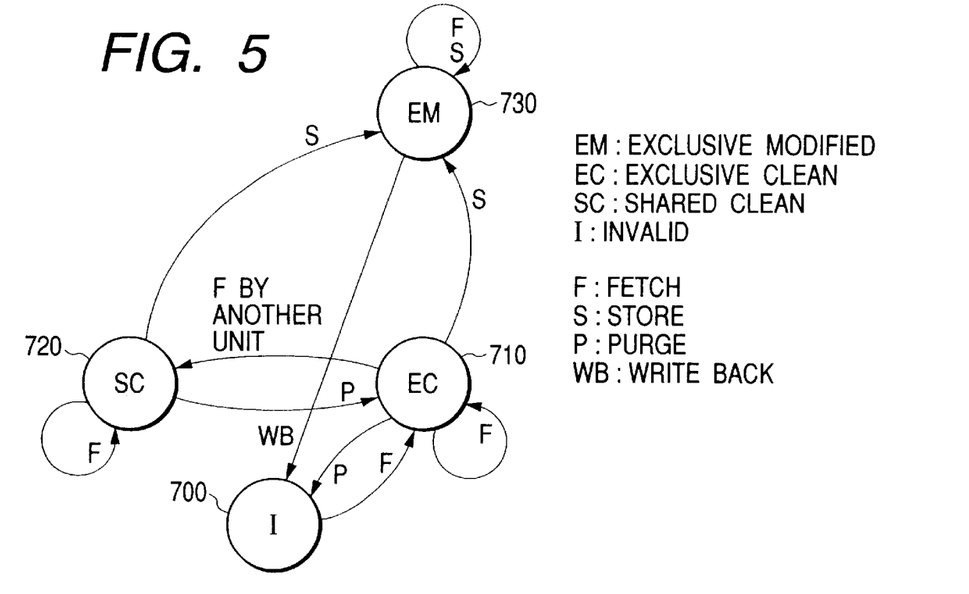
FIG. 5 is a status transition diagram that can be adopted for the cache coherency control of the above described embodiments.

FIG. 5 shows a status transition diagram of the case where cache coherency control is conducted by using the conventional invalidation type protocol. It is now assumed for brevity of description that "store" is conducted after "fetch." Even in the case where "store" is not conducted after "fetch," a similar status transition diagram can be made.

In the case where the pertinent line is unused (the pertinent line is not present in the cache), the line is in an I (Invalid) status 700. If the line is registered in the cache by a fetch (F) request, the line status advances to an EC (Exclusive Clean) status 710.

So long as the line is fetched by the same L2 memory unit, the line status remains in the EC status. If there is a fetch request from another L2 memory unit, however, then the line status advances to an SC (Shared Clean) status 720. If in the EC status 710 there is a store (s) request from an L1 memory to the unit, then the line status advances to an EM (Exclusive Modified) status 730. If in the EC status the pertinent line is purged (P), then the line status returns to the I status.

So long as the line is fetched in the SC status 720, the line remains in the SC status. If any L1 unit has issued a store request to the pertinent line, then the pertinent lines of caches other than the L2 memory unit of the request destination are invalidated. Therefore, the line status advances to the EM (Exclusive Modified) status 730.

So long as the same L2 unit is accessed in the EM status, the line status remains in the EM status. If there is an access request to another L2 unit, however, the pertinent line is subject to write-back (WB) and the line status is returned to the I status once.

Figure 6:
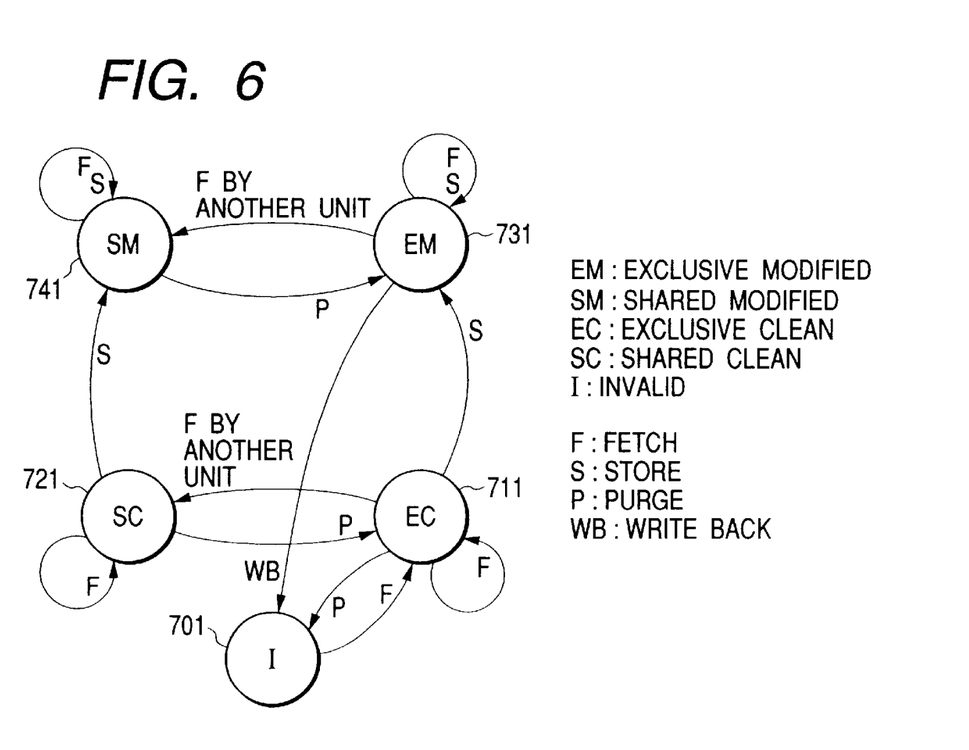
FIG. 6 is another status transition diagram that can be adopted for the cache coherency control of the above described embodiments.

In the same way, FIG. 6 shows a status transition diagram of the case where cache coherency control is conducted by using the conventional update type protocol. FIG. 6 differs from FIG. 5 in that an SM (Shared Modified) status 741 is provided. Transitions to the status 741 are added. In other words, in the case where a store request is issued in the SC (Shared Clean) status by an L1 memory unit, the line status advances to the SM status 741.

In the update type protocol, contents of all L2 memory units using the pertinent line are updated by a store request in the SM status. Upon a fetch store request in the SM status, therefore, the line status remains in the SM status.

If the number of L2 memory units using the pertinent line has become one as a result of a purge request, then the line status advances to an EM status 731. If there is a fetch from a different L2 memory unit in the EM status, the line status advances to the SM status.

As one simple method, there is conceivable such a scheme as to detect the SM status of FIG. 6 and discriminate between the "common region" requiring cache coherency control among a plurality of units and remaining "dedicated regions." Even if an alteration is applied to the line, it is limited to an alteration within one memory unit, until the line status advances to the SM status in FIG. 6. As for the cache coherency control, it can be controlled efficiently with the store-in protocol or the invalidation protocol.

As for the SM status, cache coherency control among a plurality of memory units becomes necessary, and consequently the store-protocol or the update type protocol is suitable.

In many cases, however, the above described method is not sufficient. Because the region cannot be immediately judged to be the "common region" requiring the update type cache coherency control, on the grounds of the SM status. The reason is that the OS frequently switches over the processor that executes the user process in order to improve the system performance in some cases (context switch). In such a case, there is a possibility that the same lines are registered in a plurality of memory units. However, the possibility of reusing them is usually low.

The above described problem can be avoided by using a further sophisticated reference history information. This will now be described by referring to FIG. 7.

Figure 7:
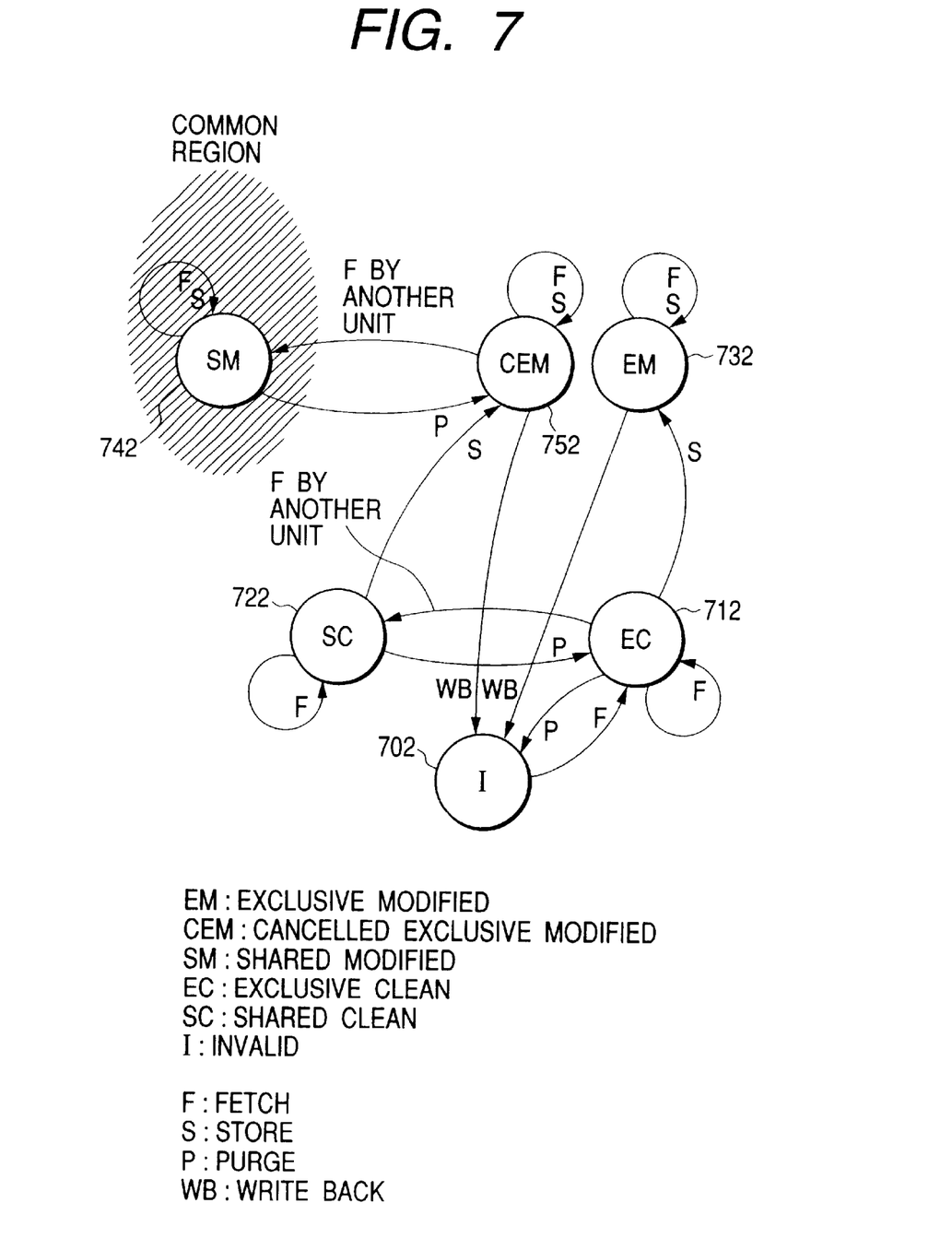
FIG. 7 is still another status transition diagram that can be adopted for the cache coherency control of the above described embodiments.

FIG. 7 shows a status transition diagram and a dynamic regional partitioning judgment method that are used in a dynamic cache coherency control alteration protocol of the present invention. FIG. 7 differs from FIG. 5 in a transition from the SC (Shared Clean) status. If there is a store request in an SC status 722, then processing conforming to the invalidation type protocol is conducted, and the pertinent lines of L2 memory units other than the request source are invalidated. In FIG. 7, the line status advances to a CEM (Canceled Exclusive Modified) status 752 instead of the EM status as in FIG. 5.

The CEM status functions as the EM status in the update type protocol. If there is a fetch request here from a different L2 memory unit, the line status advances to an SM status 742. In other words, the invalidation type status transition of FIG. 5 and the update type status transition of FIG. 6 are coupled via the CEM status. Only in the case where a line shared in the past (SC status) is canceled once by the invalidation type protocol and then accessed again, therefore, the line status advances to the SM status 742. As a result, the possibility of the pertinent line being the "common region" becomes high, and the problem of the context switch conducted by the OS can be avoided. Therefore, it is proper to judge the line of the status 742 to be the "common region" and apply the update type protocol or the store-through protocol to the pertinent line.

As heretofore described, the history manager discriminates between the "dedicated regions" and the "common region" (line attribute) and determines the next line status, on the basis of the current line status and an access request.

The cache coherency manager conducts line coherency control on the basis of the line attribute derived by the history manager. In the cache coherency control, switchover of a plurality of cache coherency control protocols implemented in the known technique is conducted. Basically, it is possible to start from the invalidation type protocol or the store-in protocol and switch it over to the update type protocol or the store-through protocol after a judgment of "common region."

By thus analyzing the reference history information, it becomes possible to judge the region, attribute in more detail.

For example, by controlling this judgment with software, it also becomes possible to optimize the cache coherency control system depending on the application.

Figure 2:
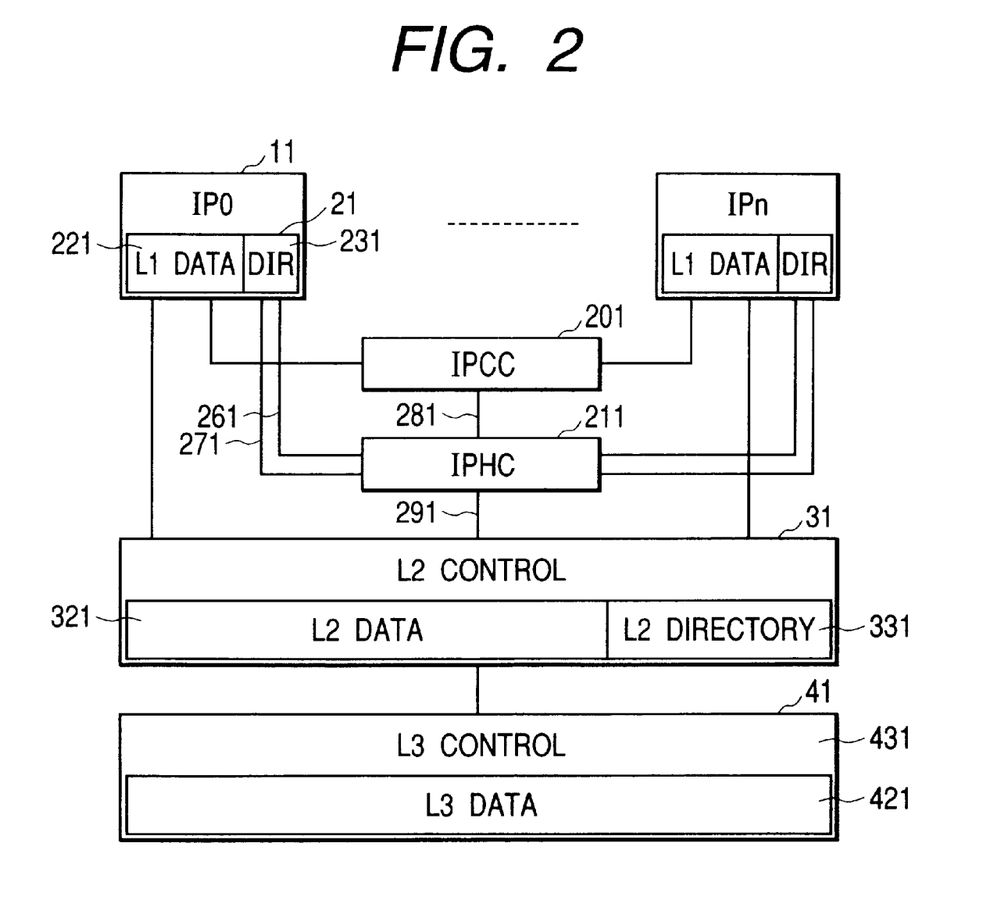
FIG. 2 is a block diagram showing a memory configuration of a multiprocessor system of another embodiment according to the present invention.

FIG. 2 shows a memory configuration of a multiprocessor system of a second embodiment according to the present invention.

In the same way as the first embodiment, the memory configuration has a three order hierarchy structure of L1 to L3 memory units. An L1 memory unit 21 includes an L1 cache data array (L1 data) 221 and an L1 cache directory (dir) 231. An L1 memory unit 21 is provided in each of a plurality of processors (IP0 to IPh) 11. In an L2 memory unit 31 as well, an L2 cache data array 321 and an L2 cache directory 331 are present. An L3 memory unit 41 includes an L3 data array 421 and its controller 431.

An L1 cache history manager 211 monitors the status of the L1 memory units. The L1 cache history manager 211 knows requests of block read from L2 (fetch), block write from a processor (store), block write back into L2 (write back), and block registration cancel (purge) by an L1 cache access request 271. Furthermore, the L1 cache history manager 211 can know block status information representing, for example, in which L1 memory unit each block of the L1 cache is previously registered, through L1 cache status information 261.

By monitoring information of these kinds affecting internal statuses of the L1 memory units, the L1 cache history manager 211 judges an attribute of each block of L1 memory units (the dedicated region or the common region). Its result is conveyed to an L1 cache coherency manager 201 as an L1 cache attribute 281. In the L1 cache coherency manager 201, an optimum L1 cache coherency control method is conducted on the basis of the attribute 281.

To be concrete, when a store request is issued for a block belonging to a common region, the update type protocol is applied to other L1 memory units using the pertinent block. For a block belonging to the dedicated regions, however, coherency control using the invalidation type protocol is conducted.

By thus switching over the L1 cache coherency control according to the block attribute, the performance degradation caused by mutual invalidation between L1 memory units can be prevented also for store requests issued to the dedicated regions.

Each of the L1 cache data array 221, the L1 cache directory 231, the L1 cache history manager 211, and the L1 cache coherency manager 201 can be implemented by a configuration similar to a corresponding circuit of the L2 cache in the first embodiment.

However, L1 cache status information 261 inputted to the L1 cache history manager 211 includes block status information including a referring device identifier (IPID, which corresponds to SCID of FIG. 4) and a block status (BSTAT, which corresponds to LSTAT).

A point deserving special mention is that the L1 cache history manager 211 can be taken in the L2 memory unit 31 by providing such a restriction that the L2 cache contains the L1 cache. In that case, the above described block status information can be stored in the directory entry of the L2 cache. This is made possible by registering all blocks registered in L1 in L2 as well.

Since the status of an L1 block can be known in one location of the L2 directory, the communication overhead of the L1 cache status information 261 shown in FIG. 2 can be reduced.

The size of a line which is the unit of management of the L2 directory is in a general case larger than the size of a block which is the unit of management of the L1 directory. In that case as well, however, the above described block status information can be stored in the L2 directory entry by providing a sub-entry associated with a block in the L2 directory entry.

Figure 8:
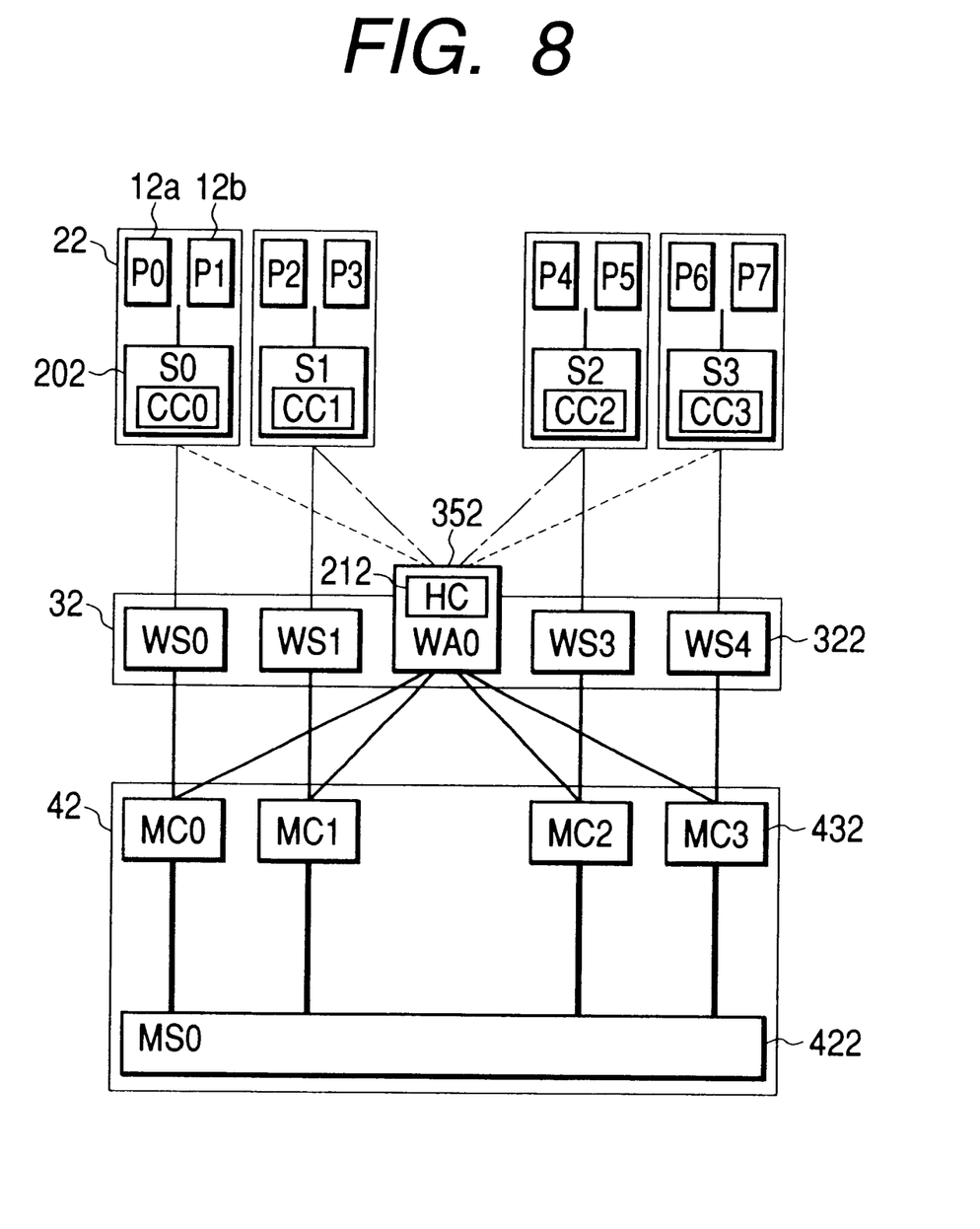
FIG. 8 is a block diagram showing a memory configuration of a multiprocessor system of still another embodiment according to the present invention.

FIG. 8 shows a memory configuration of a multiprocessor system of a third embodiment according to the present invention.

A plurality of processors 12a and 12b are connected to an L1 memory unit 22. Each processor has an upper cache memory (L0 memory unit) individually, in some cases. Or a plurality of processors and an L1 memory unit shared by them might be integrated into a single chip, in some cases.

A plurality of L1 memory units 22 are connected to an L2 memory unit 32. The L2 memory unit 32 is connected to an L3 memory unit 42.

The L2 memory unit 32 includes an L2 cache controller 352 and L2 data arrays 322. The L2 cache controller 352 includes an L2 directory and an L1 cache history manager 212.

A plurality of L2 data arrays 322 are provided in order to improve the throughput, and they are used in an address interleave form. In association with them, a plurality of L3 memory control units 432 are provided in the L3 memory unit 42 as well.

The L2 cache controller 352 efficiently determines a block attribute by storing block status information in the L2 directory as described in the second embodiment of the present invention.

The block attribute is notified to an L1 cache coherency manager 202 disposed distributively in the L1 memory units. Preferably, the notified attribute is stored in the pertinent block entry in the directory of each L1 memory unit.

In each memory unit, coherency control of the pertinent block is conducted in accordance with a judgment of the block attribute (representing whether the block belongs to the "dedicated regions" or "common region"). Especially in the case where the update type protocol is applied, the L1 cache coherency manager 202 disposed distributively updates a different L1 cache through the intermediation of the L2 cache controller 352.

In the case of the invalidation type protocol, the L2 cache controller 352 directly issues a cancel request to the pertinent L1 memory unit.

By adopting such a configuration, store operations from L1 to L2 can be suppressed to the required minimum and communication between L2 memory units and the L2 memory unit can be remarkably reduced. Especially in the case of an on-chip multiprocessor in which a plurality of processors are integrated on a single chip, sufficient data cannot be supplied to processors in the conventional configuration because of an upper limit of a memory throughput per chip, resulting in degraded performance. In the configuration of the present embodiment, the throughput between L1 and L2 can be suppressed remarkably and the performance of the on-chip multiprocessor can be improved.

Figure 9:
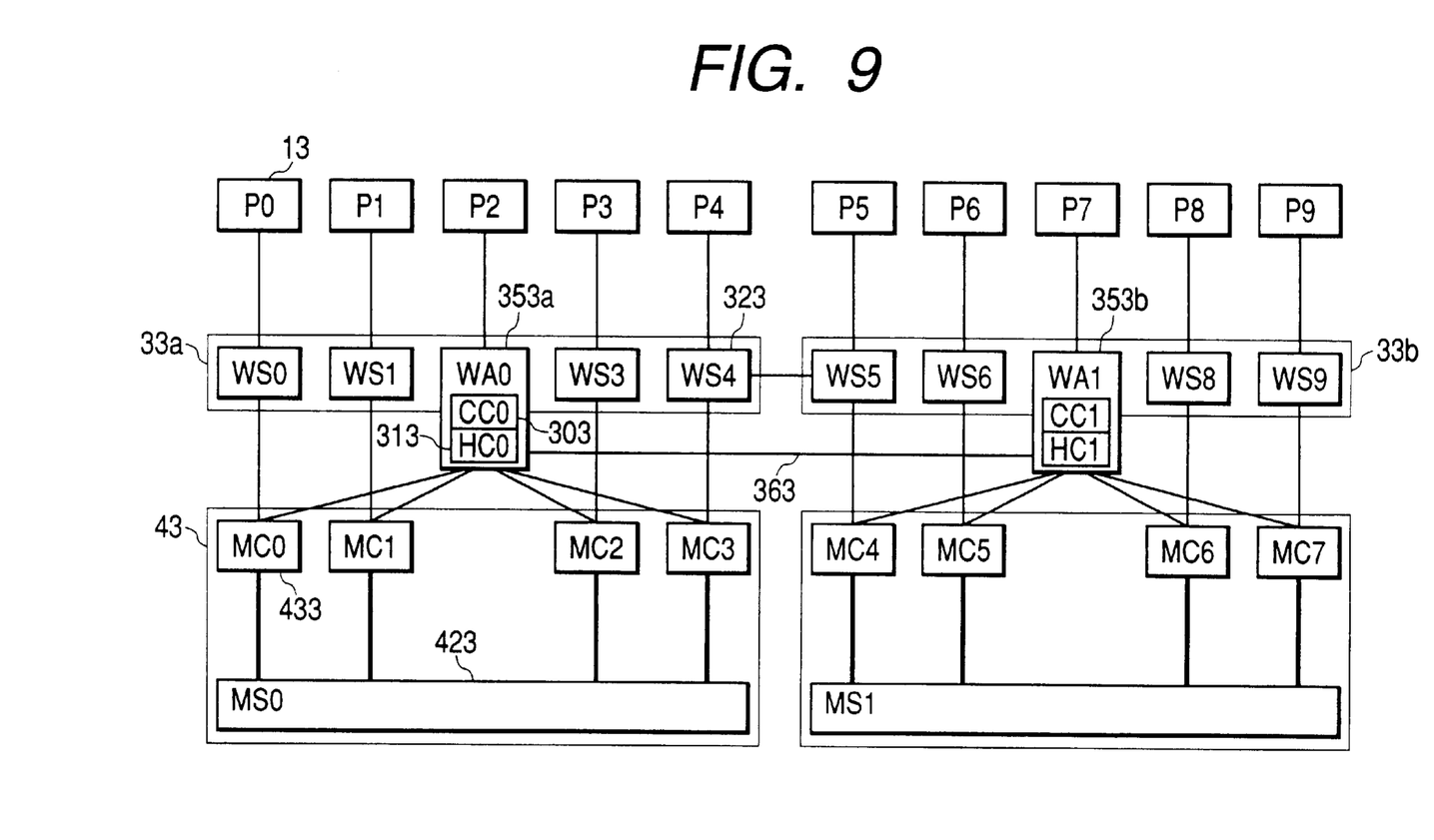
FIG. 9 is a block diagram showing a memory configuration of a multiprocessor system of yet another embodiment according to the present invention.

FIG. 9 shows a memory configuration diagram of a multiprocessor system of a fourth embodiment according to the present invention.

An L2 memory unit 33a includes an L2 cache controller 353a and L2 data arrays 323. The L2 cache controller 353a includes an L2 directory (L2 history directory), an L2 history manager 313, and an L2 cache coherency manager 303. The L2 data arrays 323 and L3 memory units 43 (each including L3 memory control units 433 and L3 memory data array) have the same configurations as those of the third embodiment according to the present invention.

A history manager and a cache coherency manager are distributively disposed in L2 cache controllers 353a and 353b. This is made possible by storing directory information of the whole L2 in 353a and 353b.

In the case where a change has occurred in the line status of the L2 cache, the line status is updated through 363.

Each of the L2 cache controllers 353a and 353b judges a line attribute (whether it corresponds to a "dedicated region" or "common region") on the basis of the line status and an L2 access request. On the basis of a result thereof, each of the L2 cache controllers 353a and 353b conducts coherency control.

By adopting such a configuration, store requests from L2 to L3 can be reduced remarkably. Especially in the multi-L2 system in which a plurality of L2 memory units are provided as shown in FIG. 9, it becomes possible to reconcile the throughput between L2s and the throughput between L2 and L3. As a result, it becomes possible to fast conduct processing extending over a plurality of L2s which causes remarkable degradation of performance in the conventional configuration.

In the present invention, it is dynamically determined whether the region is a "dedicated region" used for an individual processor or a "common region" used by a plurality of processors, as heretofore described. By always conducting optimum cache coherency control, therefore, performance degradation caused by cache coherency control can be suppressed to the minimum.

In particular, the overhead of mutual invalidation for the common region can be improved remarkably.

Furthermore, as a result thereof, the performance in the on-chip multi-system and multi-L2 system can be improved.

What is claimed is:

1. In a data processing system including:

a plurality of processors; and a plurality of hierarchical memories, said hierarchical memories including at least a main storage and a cache memory unit, said main storage storing a plurality of information sets, said cache memory unit storing information subsets obtained by dividing information sets, a cache access control system comprising:

a plurality of cache memory units;

a cache coherency manager for conducting cache coherency control among said cache memory units; and a history manager for switching over an operation mode of said cache coherency manager, wherein based on a status of an information subset stored in the cache memory units and a request of access to said information subset, said history manager determines a status transition of said information subset and an attribute representing whether said information subset corresponds to a "common region" shared by a plurality of processors or a "dedicated region" exclusively used by a single processor, and wherein based on said attribute, said cache coherency manager dynamically alters coherency control processing at time of a cache store request.

2. A cache access control system according to claim 1, wherein in status transitions conducted in said history manager, if a certain information subset is invalidated once by cache coherency control and then accessed again, said attribute is judged to be a "common region" shared by a plurality of processors, and otherwise, said attribute is judged to be a "dedicated region" exclusively used by a single processor.

3. A cache access control system according to claim 1, wherein
if said attribute is a "common region," said cache coherency manager conducts coherency control by using an update type protocol, and
if said attribute is a "dedicated region," said cache coherency manager conducts coherency control by using an invalidation type protocol.

4. A cache access control system according to claim 1, wherein
if said attribute is a "common region," said cache coherency manager conducts coherency control by using a store-through protocol, and
if said attribute is a "dedicated region," said cache coherency manager conducts coherency control by using a store-in protocol.

5. In a data processing system including:

a plurality of processors; and a plurality of hierarchical memories, said hierarchical memories including at least a main storage and a cache memory unit, said main storage storing a plurality of information sets, said cache memory unit storing information subsets obtained by dividing information sets, a data processing apparatus comprising:
  a history directory having a plurality of entries, each of said entries including an address indication for specifying said information subset, a number for identifying a processor using said information subset, and status information for specifying a current status of said information subset;
  a history manager for judging an attribute of a pertinent information subset, based on an access request from a plurality of cache memory units and status information in said history directory; and
  a cache coherency manager for dynamically altering coherency control processing at time of a cache store request of each cache, based on the attribute judged by said history manager,
  wherein said history manager is connected to a plurality of cache coherency managers.

6. In a data processing system including:

a plurality of processors; and a plurality of hierarchical memories, said hierarchical memories including at least a main storage and a cache memory unit, said main storage storing a plurality of information sets, said cache memory unit storing information subsets obtained by dividing information sets, a data processing system comprising:
  a history directory having a plurality of entries, each of said entries including an address indication for specifying said information subset, a number for identifying a processor using said information subset, and status information for specifying a current status of said information subset;
  a history manager for judging an attribute of a pertinent information subset, based on an access request from a plurality of cache memory units and status information in said history directory; and
  a cache coherency manager for dynamically altering coherency control processing at time of a cache store request of each cache, based on the attribute judged by said history manager,
  wherein said history directory, said history manager, and said cache coherency manager are provided in said cache memory units.

* * * * *